US012786113B2

(12) United States Patent
Qu et al.

(10) Patent No.: US 12,786,113 B2
(45) Date of Patent: Nov. 3, 2026

(54) EDGE COMPUTING DATA AND SERVICE DISCOVERY USING AN INTERIOR GATEWAY PROTOCOL (IGP)

(71) Applicant: Huawei Technologies Co., Ltd., Shenzhen (CN)

(72) Inventors: Yingzhen Qu, San Jose, CA (US); Michael McBride, Laguna Niguel, CA (US); James N. Guichard, Hollis, NH (US)

(73) Assignee: Huawei Technologies Co., Ltd., Shenzhen (CN)

( * ) Notice: Subject to any disclaimer, the term of this patent is extended or adjusted under 35 U.S.C. 154(b) by 443 days.

(21) Appl. No.: 18/315,375

(22) Filed: May 10, 2023

(65) Prior Publication Data

US 2023/0353479 A1 Nov. 2, 2023

Related U.S. Application Data

(63) Continuation of application No. PCT/US2021/032767, filed on May 17, 2021.

(Continued)

(51) Int. Cl.

*H04L 45/00* (2022.01)
*H04L 45/03* (2022.01)
*H04L 45/12* (2022.01)

(52) U.S. Cl.

CPC .............. *H04L 45/32* (2013.01); *H04L 45/03* (2022.05); *H04L 45/12* (2013.01)

(58) Field of Classification Search

CPC .......... H04L 45/32; H04L 45/03; H04L 45/12

(Continued)

(56) References Cited

U.S. PATENT DOCUMENTS 7,903,554 B1 * 3/2011 Manur .................. H04L 47/724 370/254
8,792,501 B1 * 7/2014 Rustagi .................. H04L 45/58 370/392

(Continued)

FOREIGN PATENT DOCUMENTS

CN 101155135 A 4/2008
CN 112398740 A * 2/2021 ........... H04L 45/741

(Continued)

OTHER PUBLICATIONS

Acee Lindem, Naiming Shen, Rahul Aggarwal, Scott Shaffer, et al: “Extensions to IS-IS and OSPF for Advertising Optional Router Capabilities; draft-raggarwa-igpcap-00.txt”, Internet Engineering Task Force, IETF; Standardworkingdraft, Internet Society (ISOC) 4, Rue Desfalaises CH—1205 Geneva, Switzerland, May 1, 2002, XP015034171, total 14 pages.

(Continued)

*Primary Examiner* — Anthony Mejia
(74) *Attorney, Agent, or Firm* — Conley Rose, P.C.

(57) ABSTRACT

An edge routing device at an edge of a network including a memory storing instructions one or more processors. The one or more processors are configured to execute the instructions to determine that an edge routing capability of the edge routing device has been updated, encode an updated edge routing capability into a type length value (TLV) structure of a link state message, and flood the link state message including the TLV structure having the updated edge routing capability to other edge routing devices at the edge of the network.

21 Claims, 8 Drawing Sheets

Related U.S. Application Data

(60) Provisional application No. 63/112,008, filed on Nov. 10, 2020.

(58) Field of Classification Search
USPC .......................................................... 370/392
See application file for complete search history.

(56) References Cited

U.S. PATENT DOCUMENTS

| | | | | |
|---|---|---|---|---|
| 8,897,140 | B1 * | 11/2014 | Bhattacharya | H04L 47/122 370/237 |
| 10,116,593 | B1 * | 10/2018 | Sinn | H04L 49/70 |
| 2008/0008104 | A1 * | 1/2008 | Previdi | H04L 45/28 370/255 |
| 2008/0123524 | A1 * | 5/2008 | Vasseur | H04L 45/16 370/228 |
| 2008/0151756 | A1 * | 6/2008 | Vasseur | H04L 45/28 370/237 |
| 2011/0022728 | A1 * | 1/2011 | Kern | H04L 45/026 709/242 |
| 2012/0275461 | A1 * | 11/2012 | Chen | H04L 45/026 370/395.5 |
| 2014/0241372 | A1 * | 8/2014 | Chen | H04L 45/03 370/400 |
| 2014/0254427 | A1 * | 9/2014 | Chen | H04L 45/03 370/254 |
| 2014/0254513 | A1 * | 9/2014 | Abraham | H04W 4/38 370/329 |
| 2014/0310739 | A1 * | 10/2014 | Ricci | G06F 16/951 725/75 |
| 2015/0092785 | A1 * | 4/2015 | Torvi | H04L 41/0813 370/401 |
| 2015/0098338 | A1 * | 4/2015 | Bhattacharya | H04L 45/22 370/241.1 |
| 2015/0195178 | A1 * | 7/2015 | Bhattacharya | H04L 12/4633 718/1 |
| 2016/0149805 | A1 * | 5/2016 | Hui | H04L 45/28 370/389 |
| 2016/0248658 | A1 * | 8/2016 | Patel | H04L 45/03 |
| 2017/0195214 | A1 * | 7/2017 | Wu | H04L 45/023 |
| 2018/0262426 | A1 * | 9/2018 | Chen | H04L 45/24 |
| 2019/0007277 | A1 * | 1/2019 | Misra | H04L 41/145 |
| 2020/0322312 | A1 * | 10/2020 | Psenak | H04L 63/12 |
| 2021/0111984 | A1 * | 4/2021 | Patwardhan | H04L 45/037 |
| 2021/0266272 | A1 * | 8/2021 | Dutta | H04L 45/50 |
| 2023/0217195 | A1 * | 7/2023 | Poltorak | G06F 3/165 381/315 |
| 2023/0353479 | A1 * | 11/2023 | Qu | H04L 45/03 |
| 2024/0259293 | A1 * | 8/2024 | Chen | H04L 45/32 |

FOREIGN PATENT DOCUMENTS

| | | | | | |
|---|---|---|---|---|---|
| EP | 2953300 | A1 | | 12/2015 | |
| WO | WO-2017168219 | A1 | * | 10/2017 | H04L 45/68 |
| WO | WO-2018188464 | A1 | * | 10/2018 | H04L 41/06 |
| WO | WO-2020206195 | A1 | * | 10/2020 | H04L 63/0853 |
| WO | WO-2021247230 | A1 | * | 12/2021 | H04L 45/03 |

OTHER PUBLICATIONS

Ginsberg, et al, "Advertising Generic Information in IS-IS," RFC 6823, Dec. 2020, 11 pages.
Ginsberg, et al., "IS-IS Application-Specific Link Attributes," RFC 8919, Oct. 2020, 16 pages.
Ginsberg, et al., "IS-IS Extensions for Advertising Router Information," RFC 7981, Oct. 2016, 10 pages.
Ginsberg, et al., "IS-IS TE Attributes per application," draft-ginsberg-isis-te-app-03, 15 pages, Jun. 20, 2017.
Kekki, et al., "MEC in 5G Networks," ETSI White Paper No. 28, Jun. 2018, 28 pages.
Lindem, Ed., et al., "Extensions to OSPF for Advertising Optional Router Capabilities," RFC 7770, Feb. 2016, 15 pages.
Lindem, et al., "OSPF Transport Instance Extensions," draft-acee-lsr-ospf-transport-instrance-01, Nov. 2, 2020, 11 pages.
Lindem, et al., "OSPF Transport Instance Extensions," draft-ietf-ospf-transport-instance-11, Jun. 25, 2014, 14 pages.
Psenak, Ed., et al., "OSPF Application-Specific Link Attributes," RFC 8920, Oct. 2020, 19 pages.
Psenak, et al., "OSPFv2 Link Traffic Engineering (TE) Attribute Reuse," draft-ppsenak-ospf-te-link-attr-reuse-05, Jun. 23, 2017, 15 pages.
A. Lindem, Ed. et al., Extensions to OSPF for Advertising Optional Router Capabilities, RFC 4970, Jul. 2007, total 26 pages.
T. Li et al., IS-IS Extensions for Traffic Engineering et al., RFC 5305, Oct. 2008, total 34 pages.
P. Psenak, Ed. et al., RFC 8666 OSPFv3 Extensions for Segment Routing, Dec. 2019, total 18 pages.

* cited by examiner

EDGE COMPUTING DATA AND SERVICE DISCOVERY USING AN INTERIOR GATEWAY PROTOCOL (IGP)

CROSS-REFERENCE TO RELATED APPLICATIONS

This application is a continuation of International Application No. PCT/US2021/032767 filed on May 17, 2021, which claims the benefit of U.S. Provisional Patent Application No. 63/112,008 filed Nov. 10, 2020, which is hereby incorporated by reference.

TECHNICAL FIELD

The present disclosure is generally related to edge computing, and is specifically related to edge computing data and service discovery using IGP.

BACKGROUND

A routing protocol specifies how routers communicate with each other, distributing information that enables routes to be selected between any two nodes on a computer network. An interior gateway protocol (IGP) is a type of protocol used for exchanging routing information between gateways (e.g., commonly routers) within an autonomous system (AS). This routing information is used to route network-layer protocols like Internet Protocol (IP) packets. An AS is a collection of connected IP routing prefixes under the control of one or more network operators on behalf of a single administrative entity or domain that presents a common, clearly defined routing policy to the Internet (for example, a system of corporate local area networks).

Within IGP, there are different types. Type 1 IGP is referred to as a link-state routing protocol. The link-state routing protocol is performed by every switching node in the network (i.e., nodes that are prepared to forward packets; in the Internet, these are called routers). The basic concept of link-state routing is that every node constructs a map of the connectivity to the network, in the form of a graph, showing which nodes are connected to which other nodes. Each node then independently calculates the best logical path or the best next hop interface from it to every possible destination in the network. Each collection of best paths will then form each node's routing table. Examples of link-state routing protocols include Open Shortest Path First (OSPF) routing protocol and Intermediate System to Intermediate System (IS-IS or ISIS).

OSPF is a standard routing protocol designated by the Internet Engineering Task Force (IETF). OSPF uses Link State Advertisement (LSA) to exchange routing information between routers. Each router within an area will flood a type 1 LSA (also called router LSA) within the area. LSA's are encapsulated behind an OPSF packet and then an IP packet. An area is a logical group of OSPF-based networks, routers, and links that have the same area number. Routers that belong to the same area keep a topological database for the entire area. The router LSA contains information about directly connected links in the area to which the router belongs (e.g., a list with all the directly connected links of this router). Using the router LSA, a router announces its presence and lists the links to other routers or networks in the same area (e.g., edge network), together with the metrics to them. They are flooded to all routers in that area. If the router is an Area Border Router (ABR), the ABR generates type 1 LSAs for all the areas to which it is connected and sends those LSAs to all neighbors in corresponding areas.

IS-IS is a routing protocol standardized by the International Standards Organization (ISO). IS-IS uses link state protocol data unit (LSP) to exchange routing information between routers. LSP is a packet of information generated by a network router in a link state routing protocol that lists the router's neighbors. A LSP packet can also be further defined as special datagrams that determine the names of, and the cost or distance to, any neighboring routers and associated networks. They are used to efficiently determine what the new neighbor is, if a link failure occurs, and the cost of changing a link if the need arises.

Some additional differences between OSPF and IS-IS are that OSPF supports non-broadcast multiple access network (NBMA) and point-to-multipoint links, whereas IS-IS does not; IS-IS runs on the data link layer (L2), whereas OSPF runs on the network layer (L3); and OSPF supports virtual link, whereas IS-IS does not.

SUMMARY

The disclosed aspects/embodiments provide a dynamic data and service discovery mechanism that exposes (i.e., advertises) an edge routing capability of an edge router at the edge of a network better than that of the conventional edge computing networks. Instead of sending out a separate message to advertise a new or updated edge router capability, an indication of the new or updated edge router capability is added to a type length value (TLV) structure of the LSA or LSP, which typically carries only routing information. By utilizing the LSA or LSP to advertise changes in an edge router capability, the use of network resources and network bandwidth is reduced. For the avoidance of doubt, the edge router capability refers to the processing or storage capability of the edge router or the location or identity of the edge router capable of providing a requested service and not the links used to route a service request to the edge router with the processing or storage capability or providing the requested service.

A first aspect relates to an edge routing device at an edge of a network, comprising: a processor configured to: determine that an edge routing capability of the edge routing device has been updated; encode an updated edge routing capability into a type length value (TLV) structure of a link state message; and a transmitter coupled to the processor, the transmitter configured to flood the link state message including the TLV structure having the updated edge routing capability to other edge routing devices at the edge of the network.

Optionally, in any of the preceding aspects, another implementation of the aspect provides that the updated edge routing capability indicates an update to a processing capability of the edge routing device or a storage capability of the edge routing device.

Optionally, in any of the preceding aspects, another implementation of the aspect provides that the updated edge routing capability indicates a location or an identity of the edge routing device.

Optionally, in any of the preceding aspects, another implementation of the aspect provides that the link state message comprises a link state announcement (LSA) or a link state protocol data unit (LSP).

Optionally, in any of the preceding aspects, another implementation of the aspect provides that the link state message comprises an open shortest path first (OSPF)

instance, an intermediate system to intermediate system (IS-IS) instance, an OSPF transport instance, or an IS-IS transport instance.

Optionally, in any of the preceding aspects, another implementation of the aspect provides that the TLV structure includes a type field containing a value identifying the edge routing capability that was updated.

Optionally, in any of the preceding aspects, another implementation of the aspect provides that the TLV structure includes an address length field identifying a length of an edge routing capability address in a value field of the TLV structure.

Optionally, in any of the preceding aspects, another implementation of the aspect provides that the TLV structure includes a category field identifying a category of the edge routing capability that was updated and an attribute field identifying an attribute of the edge routing capability that was updated.

Optionally, in any of the preceding aspects, another implementation of the aspect provides that the processor determines that the edge routing capability of the edge routing device has been updated by detecting that the edge routing capability of the edge routing device has been updated.

Optionally, in any of the preceding aspects, another implementation of the aspect provides that the processor determines that the edge routing capability of the edge routing device has been updated based on an update indication received from a network administrator of the network.

A second aspect relates to a method of updating an edge routing capability implemented by an edge routing device at an edge of a network, comprising: determining that the edge routing capability of the edge routing device has been updated; encoding an updated edge routing capability into a type length value (TLV) structure of a link state message; and flooding the link state message including the TLV structure having the updated edge routing capability to other edge routing devices at the edge of the network.

Optionally, in any of the preceding aspects, another implementation of the aspect provides that the updated edge routing capability indicates an update to a processing capability of the edge routing device, an update to a storage capability of the edge routing device, or a location or an identity of the edge routing device.

Optionally, in any of the preceding aspects, another implementation of the aspect provides that the link state message comprises a link state announcement (LSA) or a link state protocol data unit (LSP).

A third aspect relates to an edge routing device at an edge of a network, comprising: a memory storing a capability table; a processor coupled to the memory, the processor configured to: receive a link state message from a second edge routing device at the edge of the network; decode the link state message to obtain an updated edge routing capability from a type length value (TLV) structure; and update the capability table in the memory to include the updated edge routing capability.

Optionally, in any of the preceding aspects, another implementation of the aspect provides that the updated edge routing capability indicates an update to a processing capability of the edge routing device, an update to a storage capability of the edge routing device, or a location or an identity of the edge routing device.

Optionally, in any of the preceding aspects, another implementation of the aspect provides that the link state message comprises a link state announcement (LSA) or a link state protocol data unit (LSP).

A fourth aspect relates to a method of updating a capability table implemented by an edge routing device in a network, comprising: receiving a link state message from a second edge routing device at the edge of the network; decoding the link state message to obtain an updated edge routing capability from a type length value (TLV) structure; and updating the capability table of the edge routing device to include the updated edge routing capability.

Optionally, in any of the preceding aspects, another implementation of the aspect provides that the updated edge routing capability indicates an update to a processing capability of the edge routing device, an update to a storage capability of the edge routing device, or a location or an identity of the edge routing device.

Optionally, in any of the preceding aspects, another implementation of the aspect provides that the link state message comprises a link state announcement (LSA) or a link state protocol data unit (LSP).

A fifth aspect relates to a computer program product comprising instructions stored on a non-transitory computer-readable medium that, when executed by a processor, cause an edge routing device to: determine that an edge routing capability of the edge routing device has been updated; encode an updated edge routing capability into a type length value (TLV) structure of a link state message; and flood the link state message including the TLV structure having the updated edge routing capability to other edge routing devices at an edge of a network.

A sixth aspect relates to a computer program product comprising instructions stored on a non-transitory computer-readable medium that, when executed by a processor, cause an edge routing device to: receive a link state message from a second edge routing device at an edge of a network; decode the link state message to obtain an updated edge routing capability from a type length value (TLV) structure; and update a capability table in a memory of the edge routing device to include the updated edge routing capability.

A seventh aspect relates to an edge routing system, comprising: an edge routing device as in any of the disclosed embodiments; and neighbor edge routing devices in communication with the edge routing device, the neighbor edge routing devices as in any of the disclosed embodiments.

An eighth aspect relates to an edge routing device, comprising: processing means configured to: determine that an edge routing capability of the edge routing device has been updated; and encode an updated edge routing capability into a type length value (TLV) structure of a link state message; and transmitting means coupled to the processing means, the transmitting means configured to flood the link state message including the TLV structure having the updated edge routing capability to other edge routing devices at the edge of a network.

A ninth aspect relates to an edge routing device, comprising: memory means storing a capability table; processing means coupled to the memory means, the processing means configured to: receive a link state message from a second edge routing device at an edge of a network; decode the link state message to obtain an updated edge routing capability from a type length value (TLV) structure; and update the capability table in the memory means to include the updated edge routing capability.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Edge computing is a distributed computing paradigm that brings computation and data storage closer to the location where the computation and data storage is needed. By placing edge nodes closer to where the computation and data storage is needed, response times are improved and bandwidth is saved. In some circumstances, edge computing may utilize interior gateway protocols.

Interior gateway protocols can be divided into two categories: distance-vector routing protocols and link-state routing protocols. Specific examples of IGPs include Open Shortest Path First (OSPF), Routing Information Protocol (RIP), Intermediate System to Intermediate System (IS-IS) and Enhanced Interior Gateway Routing Protocol (EIGRP).

Figure 1:
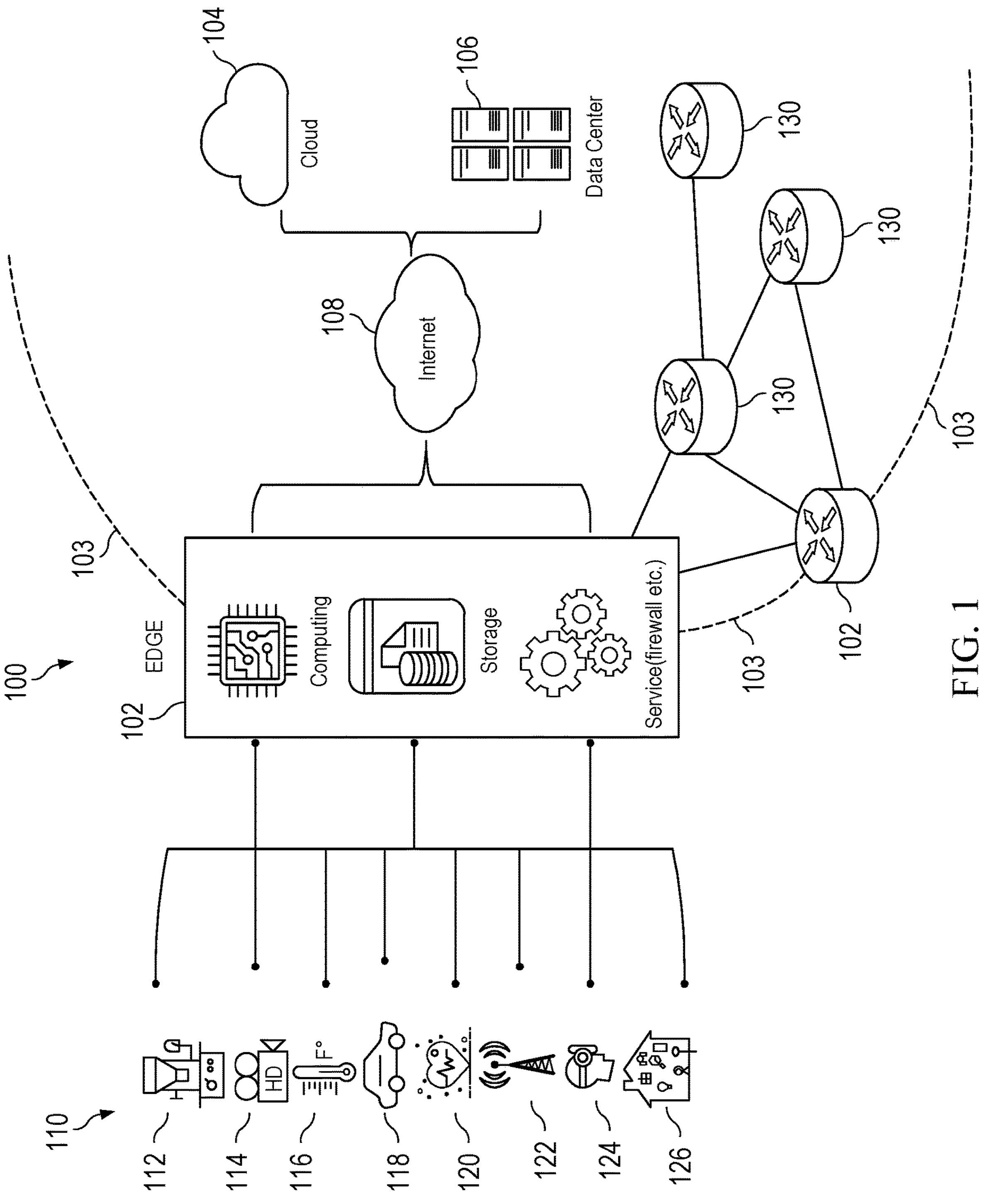
FIG. 1 is an edge computing network configured to implement the edge computing paradigm.

FIG. 1 illustrates an edge computing network 100 configured to implement the edge computing paradigm. As shown, the edge computing network 100 comprises an edge routing device 102 at an edge 103 of the network 100. The edge computing device 102 is in communication with a cloud network 104 (a.k.a., the cloud) and/or a data center 106 via the Internet 108 or other communication network.

The edge routing device 102 provides, for example, computing resources, storage capacity, and services (e.g., a firewall, etc.) to one or more applications 110. That is, the edge routing device 102 may provide computation and data storage for a commercial or industrial application 112, a video processing application 114, a temperature monitoring application 116, a driving or traffic monitoring application 118, a health monitoring application 120, a communication application 122, a virtual reality application 124, a residential monitoring or control application 126, and so on. While one edge routing device 102 is depicted in FIG. 1, it should be understood that additional edge routing devices 102 may be included in network 100 in practical applications.

Because the edge routing device 102 is geographically closer to the applications 110 than the cloud 104 or to the data center 106, response times for the applications 110 are improved and bandwidth is saved. That is, because the edge device 102 is disposed at the edge 103 of the network 100 and physically located nearer to the applications 110 than the cloud 104 or to the data center 106, service requests from the applications 110 may be handled more quickly by the edge device 102 than by either the cloud 104 or the data center 106.

The edge routing device 102 is configured to flood an LSA or an LSP to other edge routing devices 102 and/or to other routing devices 130 within the same area. The LSA or LSP communicates the local routing topology of the edge routing device 102 to other edge routing devices 102 and/or to other routing devices 130. However, the LSA or LSP does not communicate the computing resources, storage capacity, or services of the edge routing device 102 to the other edge routing devices 102 and/or to other routing devices 130. That is, the edge routing device 102 only provides the local routing topology to the other edge routing devices 102 and/or other routing devices 130. The other routing devices 130 may be referred to herein as neighbor routers or neighboring routing devices. However, the other routing devices 130 are not positioned at the edge 103 of the network 100 and are not edge routing devices.

Figure 2:
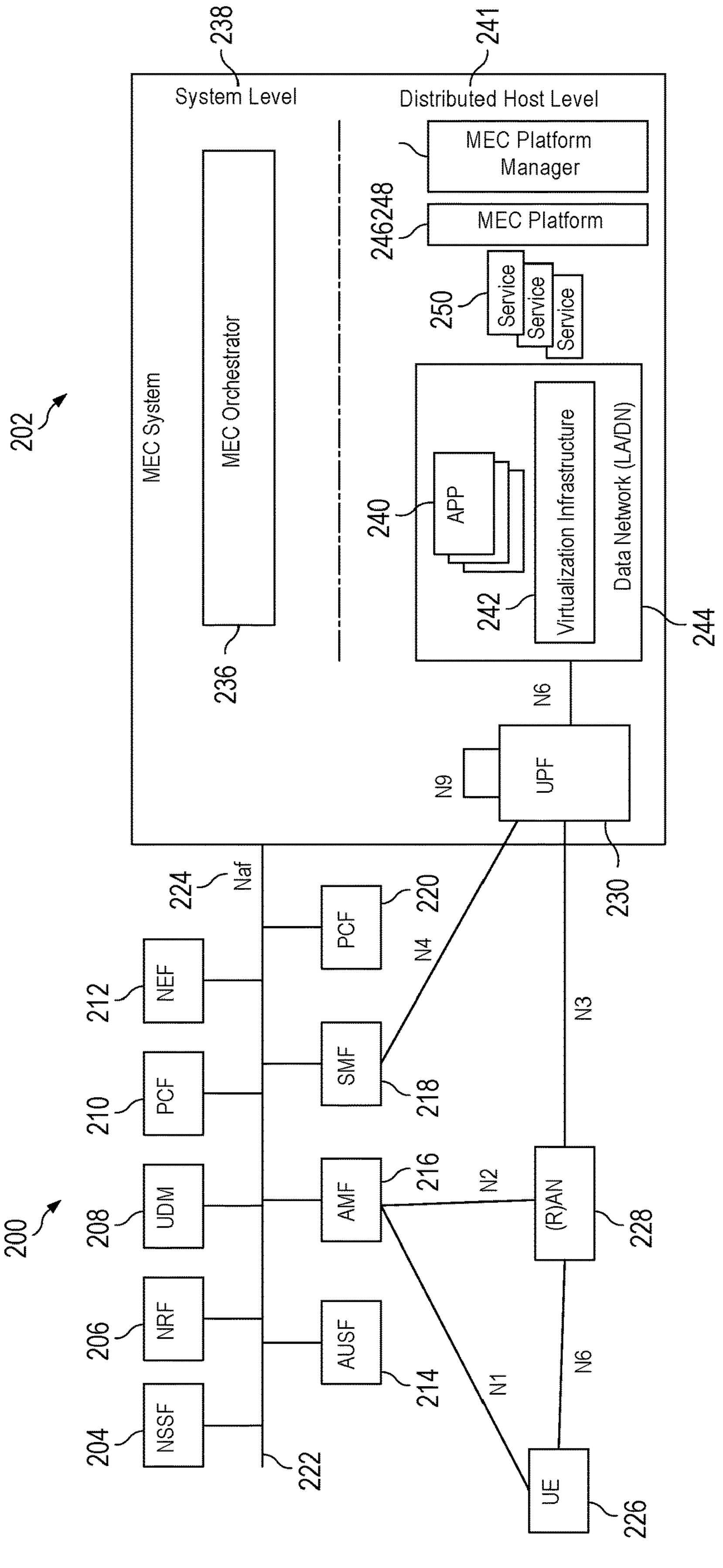
FIG. 2 is a multi-access edge computing (MEC) system integrated into a fifth generation (5G) network to implement the edge computing paradigm.

FIG. 2 illustrates a multi-access edge computing (MEC) system 202 (i.e., an edge computing device) integrated into a fifth generation (5G) network 200 to implement the edge computing paradigm.

The 5G network 200 includes a network slice selection function (NSSF) 204, a network resource function (NRF) 206, a unified data management (UDM) function 208, a policy control function (PCF) 210, a network exposure function (NEF) 212, an authentication server function (AUSF) 214, an access and mobility management function (AMF) 216, a session management function (SMF) 218, and a policy control function (PCF) 220 coupled to a message bus 222. The message bus 222 is coupled to the MEC system 200 through a service-based interface for an application function (Naf) 224.

The 5G network 200 further includes a user equipment (UE) 226, an access network (AN) 228 (or radio access network (RAN)), and a user plane function (UPF) 230. The AMF 216 is coupled to the user equipment (UE) 226 through an N1 interface and coupled to the AN 228 through an N2 interface. The UE 226 is coupled to the AN 228 through an N6 interface, and the AN 228 is coupled to the UPF 230 though an N3 interface. The N9 interface allows for communication between two of the UPFs 230.

The MEC system 202 includes an MEC orchestrator 236 at a system level 238. At a distributed host level 241, the MEC system 202 includes MEC applications 240 and a virtualization infrastructure 242 within a data network 244, an MEC platform 246, and an MEC platform manager 248. The MEC applications 240 are configured to produce various services 250.

The network functions and the services they produce are registered in the NRF 206, and in the MEC system 202 the services 250 produced by the MEC applications 240 are registered in the service registry of the MEC platform 246. To use a service 250, if authorized, a network function can directly interact with the network function that produces the service 250. The list of available services 250 can be discovered from the NRF 206. Some of the services 250 are accessible only via the NEF 212, which is also available to untrusted entities that are external to the domain. That is, the NEF 212 acts as a centralized point for service exposure and also has a key role in authorizing all access requests originating from outside of the system. The procedures related to authentication are served by the AUSF 214.

For the purposes of discussion, assume that MEC system 202 is deployed on the N6 interface (a.k.a., reference point). That is, the MEC system 202 is in a data network external to the 5G network 200. This is enabled by flexibility in locating the UPF 230. The distributed MEC host can accommodate, apart from MEC applications 240, a message broker as an MEC platform service 250, and another MEC platform service 250 to steer traffic to local accelerators. The choice to run a service as an MEC application 250 or as an MEC platform service 250 is likely to be an implementation choice and should factor in the level of sharing and authentication needed to access the service. An MEC service 250 such as a message broker could be initially deployed as a MEC application 240 to gain time-to-market advantage, and then become available as a MEC platform service 250 as the technology and the business model matures.

From the foregoing, it should be understood that the MEC system 202 may be used to implement the edge computing paradigm in a 5G context. As such, the edge computing concept may be used to provide low latency service.

The following is a non-exhaustive list of services that edge computing (as shown in FIG. 1) or MEC (as shown in FIG. 2) can provide: computing power for data analysis, performance monitoring, etc.; storage; a network service such as firewall; application specific processing; implementation of a policy; and data/content caching. To provide these functions and services, the edge/network needs to expose the data and/or service capability and locations. For example, routers in the edge have to advertise their data and service capabilities and locations to the other routers in the edge.

With the development of new technologies, such as network function virtualization (NFV), a service node (e.g., a router) can be easily created or given enhanced capabilities in the edge. This makes the service locations more dynamic. As such, a static configuration of the data and/or service capability and locations doesn't work well.

Disclosed herein is a dynamic data and service discovery mechanism that exposes (i.e., advertises) an edge routing capability of an edge router at the edge of a network better than that of the conventional edge computing networks. Instead of sending out a separate message to advertise a new or updated edge router capability, an indication of the new or updated edge router capability is added to a type length value (TLV) structure of the LSA or LSP, which typically carries only routing information. By utilizing the LSA or LSP to advertise changes in an edge router capability, the use of network resources and network bandwidth is reduced. For the avoidance of doubt, the edge router capability refers to the processing or storage capability of the edge router or the location or identity of the edge router capable of providing a requested service and not the links used to route a service request to the edge router with the processing or storage capability or providing the requested service.

Link state routing protocols (e.g., OSPFv2, OSPFv3, IS-IS, etc.) have a reliable flooding mechanism to disseminate information in the routing domain. As will be more fully explained below, either OSPF or IS-IS may be used as a transport protocol to expose or advertise edge computing resources and services. Such information can be encoded in a TLV and carried in an OSPF LSA or an IS-IS LSP. In an embodiment, the native OSPF or IS-IS protocol may be used to carry information regarding the edge computing resources and services in a regular OSPF or a regular IS-IS instance. In another embodiment, an OSPF or IS-IS transport instance, which only includes capability information and not routing information, may be utilized.

Figure 3:
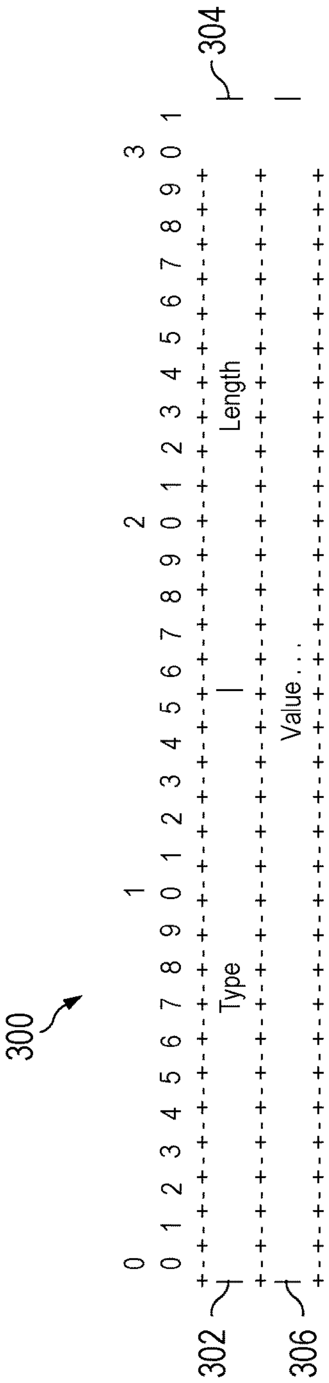
FIG. 3 is an OSPF type length value (TLV) structure.

FIG. 3 illustrates an OSPF TLV structure 300 (a.k.a., OSPF TLV format). As shown, the OSPF TLV structure 300 includes a type field 302, a length field 304, and a value field 306. The type field 302 is a 16-bit field used to identify a router capability. For example, the type field 302 includes a particular value (e.g., 0) to identify a particular capability (e.g., the router is OSPF graceful restart capable). The length field 304 is a 16-bit field that indicates the length of the value field 306 in octets. The length field 304 is a multiple of four octets, dependent on the number of capabilities advertised. The OSPF TLV structure 300 is configured to encoded in a link state message such as, for example, an LSA or an LSP.

The TLV structure 300 is configured to be encoded in a link state message such as, for example, an LSA. In an embodiment, the link state message comprises an OSPF instance or an OSPF transport instance. Advantages of using the OSPF transport instance are detailed in IETF document entitled "OSPF Transport Instance Extensions" by A. Lindem, et al., published Feb. 19, 2021. The TLV structure 300 may be carried in an OSPFv2 or OSPFv3 router information (RI) opaque LSA.

Figure 4:
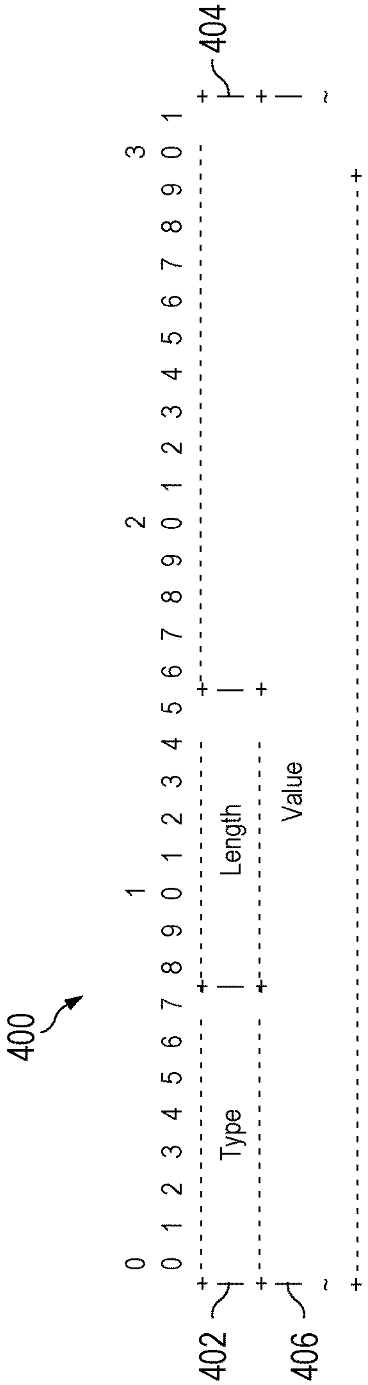
FIG. 4 is an IS-IS TLV structure.

FIG. 4 illustrates an IS-IS TLV structure 400 (a.k.a., IS-IS TLV format). As shown, the IS-IS TLV structure 400 includes a type field 402, a length field 404, and a value field 406. The type field 402 is an 8-bit field used to identify a router capability. For example, the type field 402 includes a particular value to identify a particular capability. The length field 404 is an 8-bit field that indicates the length of the value field 406 in octets. As depicted by FIG. 4, the value field 406 of the IS-IS TLV structure 400 is larger than the value field 306 of the OSPF TLV structure 300 in FIG. 3.

The TLV structure 400 is configured to be encoded in a link state message such as, for example, an LSP. In an embodiment, the link state message comprises and IS-IS instance or IS-IS transport instance. Advantages of using the IS-IS transport instance are detailed in IETF document Request for Comments (RFC) 6823 entitled "Advertising Generic Information in IS-IS" by L. Ginsberg, et al., published December 2010. In an embodiment, the TLV structure 400 may be carried in sub-TLV in an IS-IS router capability TLV.

The TLV structure 300, 400 in FIGS. 3-4 may be modified or updated to accommodate the dynamic nature of edge routing capabilities. That is, new types of TLV structures can be defined for protocol extensions at either the node level or the link level. The term node level refers to the capability of the node (e.g., router). The term link level refers to a service available via one of the physical links or interfaces of the node.

In edge computing, there are data and/or services defined at the node level such as, for example, storage, data analysis, and a firewall. For OSPF, the node level capabilities are further defined in IETF document RFC 7770 entitled "Extensions to OSPF for Advertising Optional Router Capabilities" by A. Lindem, et al., published February 2016. For IS-IS, the node level capabilities are further defined in IETF document RFC 7981 entitled "IS-IS Extensions for Advertising Router Information" by L. Ginsberg, et al., published October 2016.

There are also attributes defined at the link level such as, for example, operations, administration and management (OAM) capability. For OSPF, the link level attributes are further defined in IETF document RFC 8920 entitled "OSPF Application-Specific Link Attributes" by P. Psenak, et al., published October 2020. For IS-IS, the link level attributes are further defined in IETF document RFC 8919 entitled "IS-IS Application-Specific Link Attributes" by L. Ginsberg, et al., published October 2020.

As used herein, the node level capabilities and the link level attributes may be collectively referred to as the edge routing capability of an edge routing device.

Figure 5:
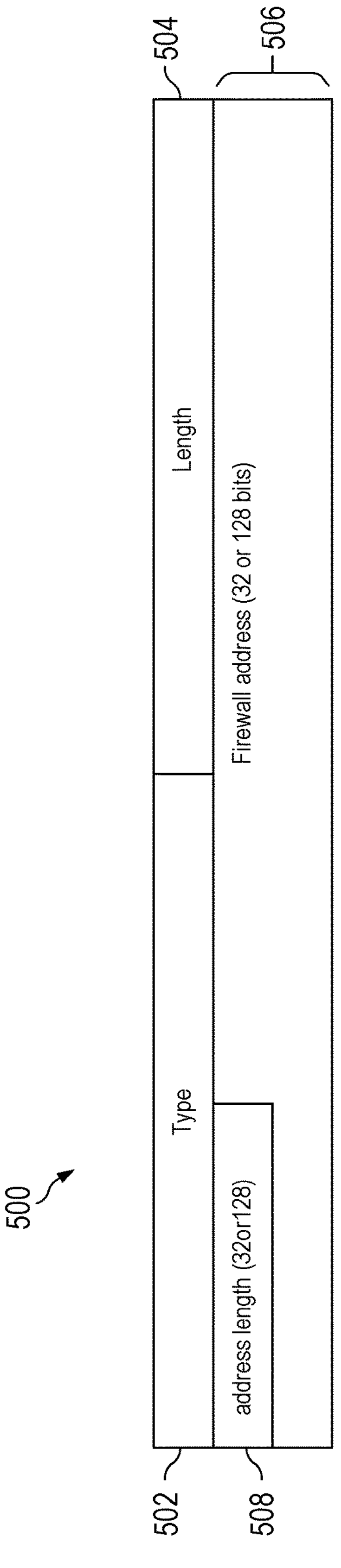
FIG. 5 is an embodiment of a TLV structure configured to announce an update to the edge routing capability of an edge routing device.

FIG. 5 is an embodiment of a TLV structure 500 configured to announce an update to the edge routing capability of an edge routing device. While the TLV structure 500 has the OSPF format, it should be appreciated that the TLV structure 500 may be modified to conform to an IS-IS TLV structure (e.g., TLV structure 400).

As shown, the OSPF TLV structure 500 includes a type field 502, a length field 504, and a value field 506. The type field 502 is a 16-bit field used to identify a new or updated router capability (e.g., a firewall service). The values that may be included in the type field to identify the new or updated router capability will be assigned by the Internet Assigned Numbers Authority (IANA). The length field 504 is a 16-bit field that indicates the length of the value field 506 in octets. The length field 504 is a multiple of four octets, dependent on the number of capabilities advertised. In an embodiment, the value field 506 includes an address length field 508. In this example, the address length field 508 contains a value that indicates whether the address of the new or updated router capability is thirty-two bits (corresponding to Internet Protocol version 4 (IPv4)) or one hundred twenty-eight bits (corresponding to Internet Protocol version 6 (IPv6)). The value field 506 also includes the address of the firewall, which may be either thirty-two bits (corresponding to IPv4) or one hundred twenty-eight bits (corresponding to IPv6). The OSPF TLV structure 500 is configured to be encoded in a link state message such as, for example, an LSA. When an IS-IS TLV structure is utilized, the TLV structure may be encoded in an LSP.

Figure 6:
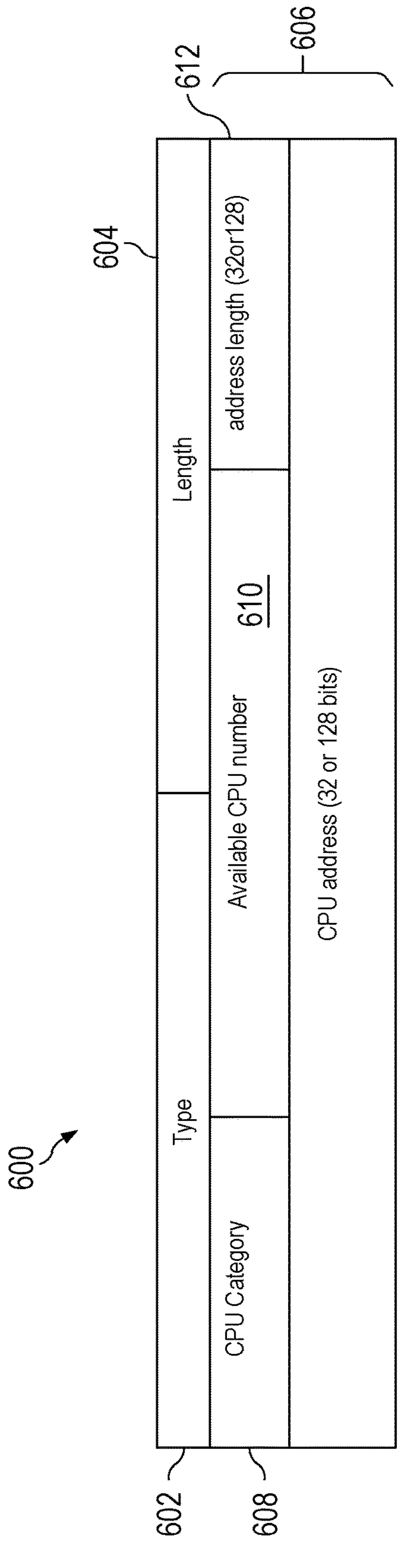
FIG. 6 is an embodiment of a TLV structure configured to announce an update to the edge routing capability of an edge routing device.

FIG. 6 is an embodiment of a TLV structure 600 configured to announce an update to the edge routing capability of an edge routing device. While the TLV structure 500 has the OSPF format, it should be appreciated that the TLV structure 600 may be modified to conform to an IS-IS TLV structure (e.g., TLV structure 400).

As shown, the OSPF TLV structure 600 includes a type field 602, a length field 604, and a value field 606. The type field 602 is a 16-bit field used to identify a new or updated router capability (e.g., a central processing unit (CPU) resource announcement). The values that may be included in the type field to identify the new or updated router capability will be assigned by IANA. The length field 604 is a 16-bit field that indicates the length of the value field 606 in octets. The length field 604 is a multiple of four octets, dependent on the number of capabilities advertised. In an embodiment, the value field 606 includes a CPU category field 608, an available CPU number field 610, and an address length field 612.

In this example, the CPU category field 608 contains a value that indicates the category or type of CPU. For example, the value may be set to one (1) to indicate that the category of CPU is a CPU or the value may be set to two (2) to indicate that the category of CPU is a graphics processing unit (GPU). In this example, the available CPU number field 610 contains a value that indicates how many cores are available. For example, the value may be set to one (1) to indicate that eight cores are available or the value may be set to two (2) to indicate that sixteen cores are available.

Continuing this example, the address length field 612 contains a value that indicates whether the address of the new or updated router capability is thirty-two bits (corresponding to IPv4) or one hundred twenty-eight bits (corresponding to IPv6). The value field 606 also includes the address of the CPU, which may be either thirty-two bits (corresponding to IPv4) or one hundred twenty-eight bits (corresponding to IPv6). The OSPF TLV structure 600 is configured to be encoded in a link state message such as, for example, an LSA. When an IS-IS TLV structure is utilized, the TLV structure may be encoded in an LSP.

Figure 7:
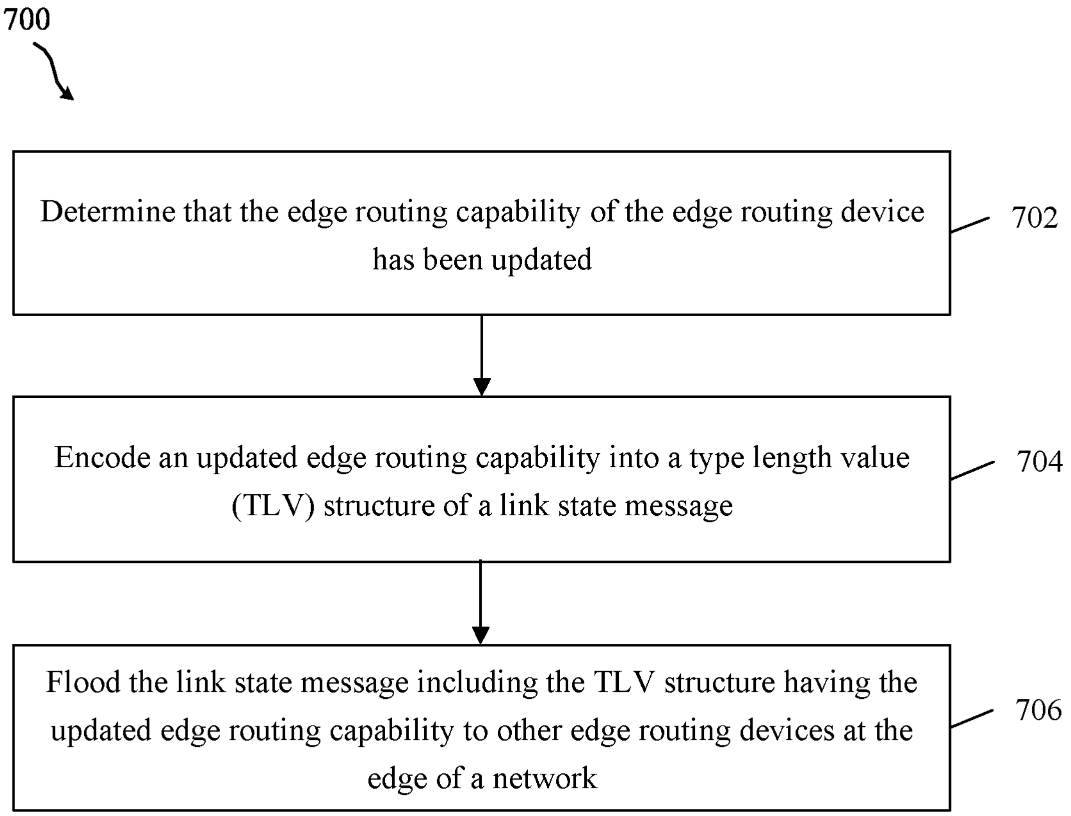
FIG. 7 is a method of updating an edge routing capability.

FIG. 7 is a method 700 of updating an edge routing capability. The method 700 may be implemented by an edge routing device (e.g., edge routing device 102) at an edge (edge 103) of a network (e.g., network 100).

In block 702, the edge routing device determines that the edge routing capability of the edge routing device has been updated. In an embodiment, the edge routing device determines that the edge routing capability of the edge routing device has been updated by detecting that the edge routing capability of the edge routing device has been updated. Such detection may be performed by a sensor included on or within the edge routing device or by some other method of detection. In an embodiment, the edge routing capability of the edge routing device has been updated based on an update indication received from a network administrator of the network. That is, the network administrator takes some action to inform the edge routing device that a capability of that edge routing device has been enhanced or otherwise updated. For example, the network administrator may change a hardware setting, update software, provide an input via a graphical user interface (GUI), and so on.

In an embodiment, the updated edge routing capability indicates an update to a processing capability of the edge routing device, an update to a storage capability of the edge routing device, and/or a location or an identity of the edge routing device. In an embodiment, the updated edge routing capability indicates a location or an identity of the edge routing device.

In block 704, the edge routing device encodes an updated edge routing capability into a TLV structure (e.g., TLV structure 500, 600) of a link state message. In an embodiment, the TLV structure includes a type field containing a value identifying the edge routing capability that was updated. In an embodiment, the TLV structure includes an address length field identifying a length of an edge routing capability address in a value field of the TLV structure. In an embodiment, the TLV structure includes a category field identifying a category of the edge routing capability that was updated and an attribute field identifying an attribute of the edge routing capability that was updated.

In an embodiment, the link state message is an LSA. In an embodiment, the link state message is and LSP. In an embodiment, the link state message comprises a regular OSPF instance or an OSPF transport instance. In an embodiment, the link state message comprises a regular IS-IS instance or an IS-IS transport instance.

In block 706, the edge routing device floods the link state message including the TLV structure having the updated edge routing capability to other edge routing devices 102 at the edge 103 of the network 100 and/or to other routing devices 130 within the network 100. Once the flooded link state message is received, the other edge routing devices 102 and/or the other routing devices 130 are able to update a capability table stored in their memory so that the capability table reflects the updated capabilities of the edge routing device 102 that flooded the link state message.

Figure 8:
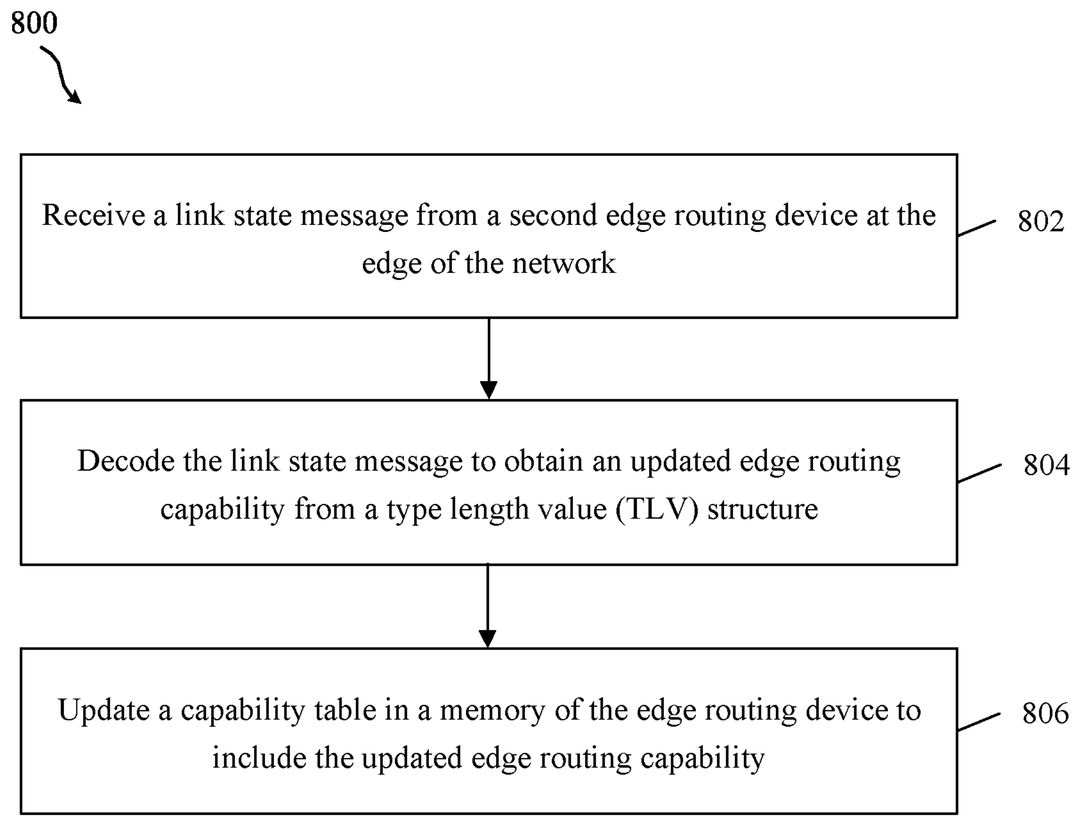
FIG. 8 is a method of updating a capability table.

FIG. 8 is a method 800 of updating a capability table. The method 800 may be implemented by an edge routing device (e.g., edge routing device 102) in a network (e.g., network 100). That is, the method 800 may be implemented by an edge routing device that receives flooded messages from another edge routing device.

In block 802, the edge routing device receives a link state message from a second edge routing device at the edge of the network. In an embodiment, the link state message is an LSA. In an embodiment, the link state message is an LSP. In an embodiment, the link state message comprises an OSPF instance or an OSPF transport instance. In an embodiment, the link state message comprises an IS-IS instance or an IS-IS transport instance.

In block 804, the edge routing device decodes the link state message to obtain an updated edge routing capability from a TLV structure (e.g., the TLV structure 500, 600). In an embodiment, the TLV structure includes a type field containing a value identifying the edge routing capability that was updated. In an embodiment, the TLV structure includes an address length field identifying a length of an edge routing capability address in a value field of the TLV structure. In an embodiment, the TLV structure includes a category field identifying a category of the edge routing capability that was updated and an attribute field identifying an attribute of the edge routing capability that was updated.

In block 806, the edge routing device updates the capability table of the edge routing device to include the updated edge routing capability. In an embodiment, the updated edge routing capability indicates an update to a processing capability of the edge routing device, an update to a storage capability of the edge routing device, or a location or an identity of the edge routing device.

Figure 9:
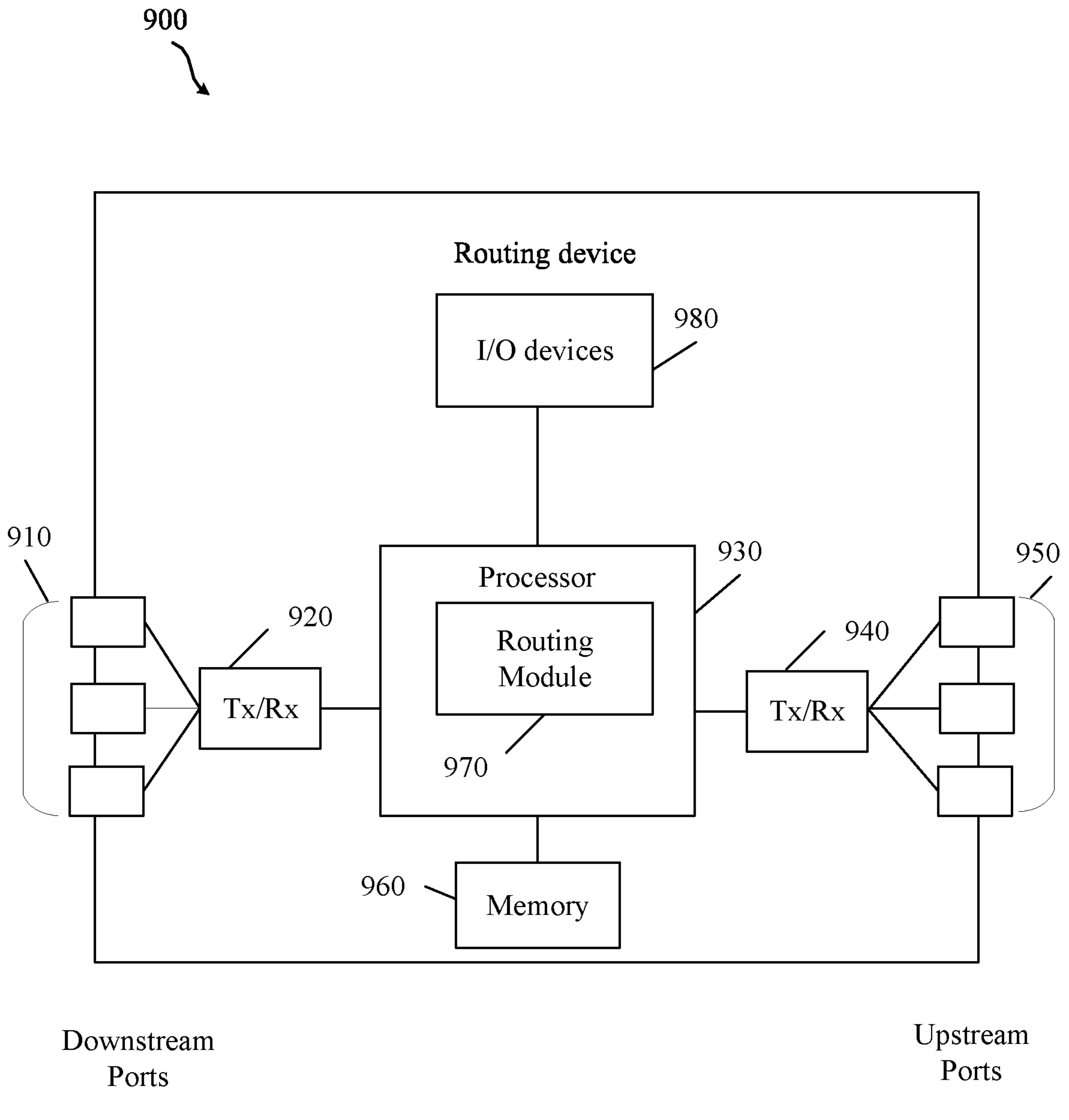
FIG. 9 is a schematic diagram of a routing device.

FIG. 9 is a schematic diagram of a routing device 900 (or a computing device) according to an embodiment of the disclosure. The routing device 900 is suitable for implementing the disclosed embodiments as described herein. The routing device 900 comprises ingress ports 910 and receiver units (Rx) 920 for receiving data; a processor, logic unit, or central processing unit (CPU) 930 to process the data; transmitter units (Tx) 940 and egress ports 950 for transmitting the data; and a memory 960 for storing the data. The routing device 900 may also comprise optical-to-electrical (OE) components and electrical-to-optical (EO) components coupled to the ingress ports 910, the receiver units 920, the transmitter units 940, and the egress ports 950 for egress or ingress of optical or electrical signals.

The processor 930 is implemented by hardware and software. The processor 930 may be implemented as one or more CPU chips, cores (e.g., as a multi-core processor), field-programmable gate arrays (FPGAs), application specific integrated circuits (ASICs), and digital signal processors (DSPs). The processor 930 is in communication with the ingress ports 910, receiver units 920, transmitter units 940, egress ports 950, and memory 960. The processor 930 comprises a routing module 970. The routing module 970 is able to implement one or more of the embodiments or actions described above. For instance, the routing module 970 implements, processes, prepares, or provides the various functions disclosed herein. The inclusion of the routing module 970 therefore provides a substantial improvement to the functionality of the routing device 900 and effects a transformation of the routing device 900 to a different state. Alternatively, the routing module 970 is implemented as instructions stored in the memory 960 and executed by the processor 930.

The routing device 900 may also include input and/or output (I/O) devices 980 for communicating data to and from a user, and for receiving input from and providing output to a network administrator. The I/O devices 980 may include output devices such as a display for displaying video data, speakers for outputting audio data, etc. The I/O devices 980 may also include input devices, such as a keyboard, mouse, trackball, etc., and/or corresponding interfaces for interacting with such output devices.

The memory 960 comprises one or more disks, tape drives, and solid-state drives and may be used as an over-flow data storage device, to store programs when such programs are selected for execution, and to store instructions and data that are read during program execution. The memory 960 may be volatile and/or non-volatile and may be read-only memory (ROM), random access memory (RAM), ternary content-addressable memory (TCAM), and/or static random-access memory (SRAM).

Figure 10:
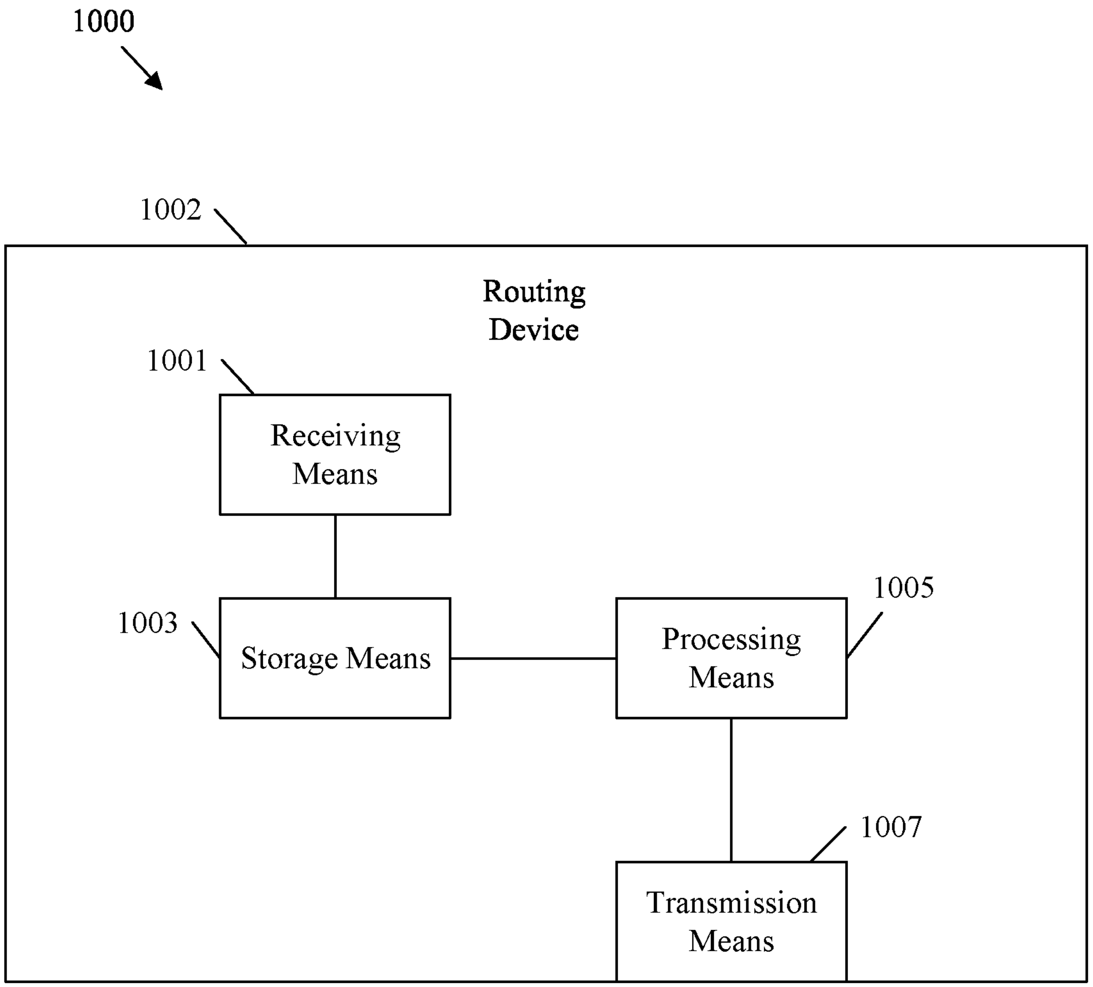
FIG. 10 is a schematic diagram of a means for routing.

FIG. 10 is a schematic diagram of an embodiment of a means for routing 1000. In an embodiment, the means for routing 1000 is implemented in a routing device 1002 (e.g., routing device 900, edge routing device 102, etc.). The routing device 1002 includes receiving means 1001. The receiving means 1001 is configured to receive a link state message. The routing device 1002 includes transmission means 1007 coupled to the receiving means 1001. The transmission means 1007 is configured to flood a link state message to other routing devices.

The routing device 1002 includes a storage means 1003. The storage means 1003 is coupled to at least one of the receiving means 1001 or the transmission means 1007. The storage means 1003 is configured to store instructions, code, or software. The routing device 1002 also includes processing means 1005. The processing means 1005 is coupled to the storage means 1003. The processing means 1005 is configured to receive the link state message and to execute the instructions stored in the storage means 1003 to perform the methods disclosed herein.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other examples of changes, substitutions, and alterations are ascertainable by one skilled in the art and may be made without departing from the spirit and scope disclosed herein.

What is claimed is:

1. An edge routing device at an edge of a network, comprising:

a memory storing instructions; and one or more processors configured to execute the instructions to cause the edge routing device to:

determine that an edge routing capability of the edge routing device has been updated, wherein the updated edge routing capability indicates an update to a processing capability of the edge routing device or a storage capability of the edge routing device;

encode an updated edge routing capability into a type length value (TLV) structure of a link state message, wherein a value field of the TLV structure includes an address length field identifying a length of an edge routing capability address and the edge routing capability address; and flood the link state message including the TLV structure having the updated edge routing capability to other edge routing devices at the edge of the network.

2. The edge routing device of claim 1, wherein the updated edge routing capability further indicates a location or an identity of the edge routing device.

3. The edge routing device of claim 1, wherein the link state message comprises a link state announcement (LSA) or a link state protocol data unit (LSP).

4. The edge routing device of claim 1, wherein the link state message comprises an open shortest path first (OSPF) instance, an intermediate system to intermediate system (IS-IS) instance, an OSPF transport instance, or an IS-IS transport instance.

5. The edge routing device of claim 1, wherein the TLV structure includes a type field containing a value identifying the edge routing capability that was updated.

6. The edge routing device of claim 1, wherein the address length field contains a value indicating whether the edge routing capability address is thirty-two bits corresponding to Internet Protocol version 4 (IPv4) or one hundred twenty-eight bits corresponding to Internet Protocol version 6 (IPv6).

7. The edge routing device of claim 1, wherein the TLV structure includes a category field identifying a category of the edge routing capability that was updated and an attribute field identifying an attribute of the edge routing capability that was updated.

8. The edge routing device of claim 1, wherein the one or more processors determine that the edge routing capability of the edge routing device has been updated by detecting that the edge routing capability of the edge routing device has been updated.

9. The edge routing device of claim 1, wherein the one or more processors determine that the edge routing capability of the edge routing device has been updated based on an update indication received from a network administrator of the network.

10. A method of updating an edge routing capability implemented by an edge routing device at an edge of a network, comprising:

determining that the edge routing capability of the edge routing device has been updated, wherein the updated edge routing capability indicates an update to a processing capability of the edge routing device or a storage capability of the edge routing device;

encoding an updated edge routing capability into a type length value (TLV) structure of a link state message, wherein a value field of the TLV structure includes an address length field identifying a length of an edge routing capability address and the edge routing capability address; and flooding the link state message including the TLV structure having the updated edge routing capability to other edge routing devices at the edge of the network.

11. The method of claim 10, wherein the updated edge routing capability further indicates a location or an identity of the edge routing device.

12. The method of claim 10, wherein the link state message comprises a link state announcement (LSA) or a link state protocol data unit (LSP).

13. An edge routing device at an edge of a network, comprising:

a memory storing a capability table; and one or more processors coupled to the memory, the one or more processors configured to:

receive a link state message from a second edge routing device at the edge of the network;

decode the link state message to obtain an updated edge routing capability from a type length value (TLV) structure, wherein a value field of the TLV structure includes an address length field identifying a length of an edge routing capability address and the edge routing capability address; and update the capability table in the memory to include the updated edge routing capability.

14. The edge routing device of claim 13, wherein the updated edge routing capability indicates an update to a processing capability of the second edge routing device, an update to a storage capability of the second edge routing device, or a location or an identity of the second edge routing device.

15. The edge routing device of claim 13, wherein the link state message comprises a link state announcement (LSA) or a link state protocol data unit (LSP).

16. A method of updating a capability table implemented by an edge routing device in a network, comprising:

receiving a link state message from a second edge routing device at the edge of the network;

decoding the link state message to obtain an updated edge routing capability from a type length value (TLV) structure, wherein a value field of the TLV structure includes an address length field identifying a length of an edge routing capability address and the edge routing capability address; and updating the capability table of the edge routing device to include the updated edge routing capability.

17. The method of claim 16, wherein the updated edge routing capability indicates an update to a processing capability of the second edge routing device, an update to a storage capability of the second edge routing device, or a location or an identity of the second edge routing device.

18. The method of claim 16, wherein the link state message comprises a link state announcement (LSA) or a link state protocol data unit (LSP).

19. A computer program product comprising instructions stored on a non-transitory computer-readable medium that, when executed by one or more processors, cause an edge routing device to:

determine that an edge routing capability of the edge routing device has been updated, wherein the updated edge routing capability indicates an update to a processing capability of the edge routing device or a storage capability of the edge routing device;

encode an updated edge routing capability into a type length value (TLV) structure of a link state message, wherein a value field of the TLV structure includes an address length field identifying a length of an edge routing capability address and the edge routing capability address; and flood the link state message including the TLV structure having the updated edge routing capability to other edge routing devices at an edge of a network.

20. A computer program product comprising instructions stored on a non-transitory computer-readable medium that, when executed by one or more processors, cause an edge routing device to:

receive a link state message from a second edge routing device at an edge of a network;

decode the link state message to obtain an updated edge routing capability from a type length value (TLV) structure, wherein a value field of the TLV structure includes an address length field identifying a length of an edge routing capability address and the edge routing capability address; and update a capability table in a memory of the edge routing device to include the updated edge routing capability.

21. The computer program product of claim 19, wherein the link state message comprises a link state announcement (LSA) or a link state protocol data unit (LSP).

* * * * *